Sept. 2, 1941.    E. H. SMITH    2,254,757
PROCESS OF MAKING TORCH TIPS
Original Filed March 13, 1939
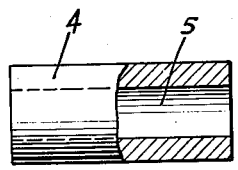
FIG. 1
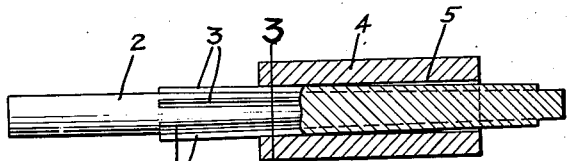
FIG. 2
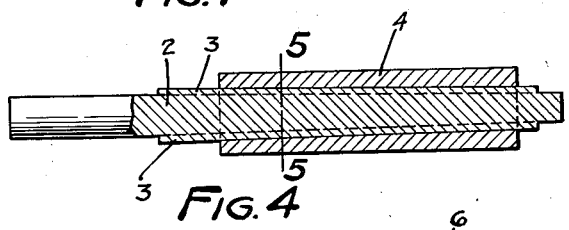
FIG. 4
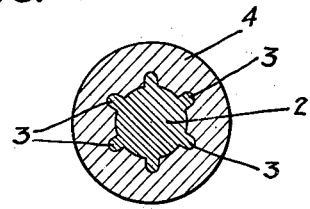
FIG. 5
FIG. 6
FIG. 7
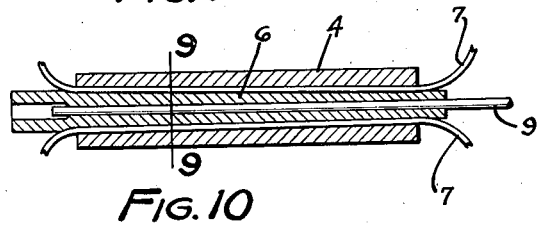
FIG. 10
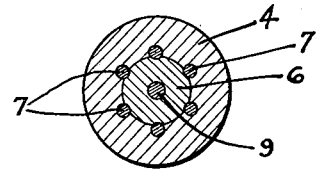
FIG. 9
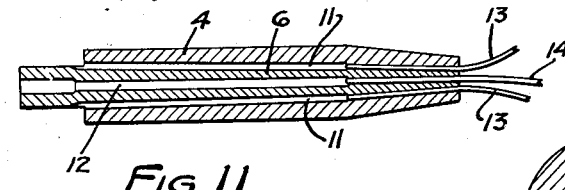
FIG. 11
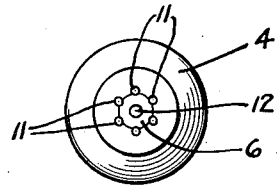
FIG. 13
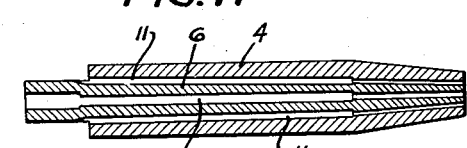
FIG. 12
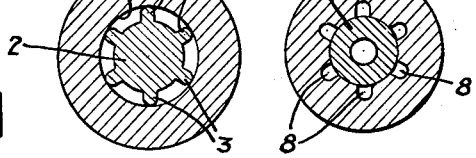
FIG. 3    FIG. 8
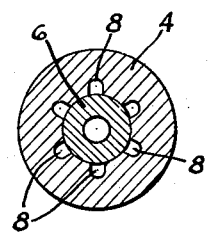
INVENTOR
ELMER H. SMITH
By Paul, Paul, Moore & Giese
ATTORNEYS Patented Sept. 2, 1941

2,254,757

UNITED STATES PATENT OFFICE 2,254,757

PROCESS OF MAKING TORCH TIPS

Elmer H. Smith, Minneapolis, Minn., assignor to Smith Welding Equipment Corporation, Minneapolis, Minn., a corporation of Minnesota Continuation of application Serial No. 261,484, March 13, 1939. This application July 3, 1939, Serial No. 282,750

5 Claims. (Cl. 29—157)

This invention relates to a novel process of making torch tips.

Cutting and welding torches are now used quite extensively in the industrial field for various purposes. The tips of such torches may frequently require interchanging, depending upon the specific type of work upon which they are used. For example, certain classes of work may require a tip capable of delivering a large flow of gas, whereas, other classes of work may require a relatively smaller flow. Such variation in flow may require tips having different sizes of gas discharge orifices. The tips may also become damaged from excessive heat, or from rough handling, rendering them unfit for use. The tips are therefore made independently of the head, whereby they may readily be interchanged, when necessary.

Most torch tips of the character herein disclosed, are usually provided with a central orifice, known as the cutting orifice, which is utilized to conduct oxygen to the metal to be cut. A plurality of relatively smaller orifices are also provided, which usually surround the central cutting orifice. The smaller orifices are utilized for conducting a suitable fuel gas to the work, such as a mixture of oxygen or acetylene, or any other fuel gas suitable for the purpose. The fuel gas serves to provide a preheating flame for preheating the work to be cut, prior to directing the cutting fluid or oxygen to the work to "cut" the metal.

Torch tips, as now commonly constructed, are more or less expensive, because it is difficult to form the small apertures lengthwise through the tip body without drilling, which is laborious, and consumes considerable time. Numerous attempts have heretofore been made to construct a torch tip in an inexpensive, practical manner, but to the best of my knowledge, none of these attempts have been wholly successful.

The novel process employed in the formation or manufacture of the novel torch tip herein disclosed, is extremely simple and inexpensive, and has resulted in the production of a torch tip of low cost without sacrificing any of the desired qualities of such a tip.

An object of the present invention therefore is to provide an improved process for making torch tips of the character disclosed, which requires no drilling, and which is accomplished by fewer operations, whereby the resultant tip may be manufactured at less cost.

A further object is to provide a process of forming torch tips, which consists in interfitting two members of a ductile metal, one of which is longitudinally grooved, and swaging the outer member to contract it so that its bore will sealingly engage the periphery of the inner member, and thereby seal the joints between said members and the passages formed by the grooves in one of said members.

A further and more specific object of the invention is to provide a process of forming a torch tip which utilizes a ribbed arbor upon which a blank of ductile metal is placed and swaged until its bore is reduced and shaped to conform to the periphery of the arbor, then replacing the arbor with an unribbed hollow core of ductile metal, whereby a plurality of apertures are provided in which wire elements of a predetermined diameter are inserted, after which the outer member or blank is again swaged to further reduce its diameter and lengthen it, and whereby the apertures in which said wires are inserted are reduced to the diameter of the wires, and at the same time, the outer blank member and the inner core may, by the necessary swaging operations, become firmly united to one another, thereby forming, in effect, an integral unit.

The present application is a continuation of my pending application, Serial Number 261,484, filed March 13, 1939, and allowed May 25, 1939.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

In the drawing:

Figure 1 shows the outer tubular blank in its normal shape before swaging;

Figure 2 shows the blank mounted on the ribbed steel arbor;

Figure 3 is an enlarged cross-sectional view on the line 3—3 of Figure 2;

Figure 4 is a view similar to Figure 2, but showing the outer blank reduced in diameter by the first swaging operation, whereby it is reduced in diameter and elongated;

Figure 5 is an enlarged cross-sectional view on the line 5—5 of Figure 4, showing the parts after the first swaging operation;

Figure 6 shows the inner tube section in its normal shape;

Figure 7 shows the inner tube section converted into a tapered core by swaging;

Figure 8 is a cross-sectional view showing the blank, after having its bore longitudinally grooved, fitted onto the tapered core shown in Figure 7;

Figure 9 is an enlarged cross-sectional view on the line 9—9 of Figure 10;

Figure 10 is a longitudinal sectional view showing the tapered core of Figure 7 inserted into the tapered bore of the outer tube section;

Figure 11 is a longitudinal sectional view showing the torch tip following the final swaging operation;

Figure 12 is a similar view showing the body of the tip completed; and

Figure 13 is an end view of Figure 12.

In carrying out my novel process, as disclosed in Figures 1 to 13, inclusive, a suitable arbor, generally indicated by the numeral 2 is provided. This arbor may be slightly tapered, although not necessarily, and has a plurality of longitudinally extending ribs 3 on its periphery, as clearly illustrated in Figure 2. The arbor is supported in a suitable device (not shown). To form the torch tip, a tubular blank 4, of a suitable ductile material such, for example, as copper tubing, having a bore 5 therein, is placed on the arbor 2, as shown in Figures 2 and 3. The blank is then swaged in the usual manner, whereby its diameter is reduced and its body elongated, as shown in Figure 4. The swaging operation reduces the bore of the blank to conform to the periphery of the arbor 2, as shown in Figure 5, whereby a plurality of longitudinally extending grooves are provided in said bore, when the arbor 2 is removed therefrom.

In the next step, the blank 4 is removed from the arbor 2 and a tubular core 6 is inserted through the grooved bore of the blank, as best illustrated in Figure 8. The core 6, before being inserted through the bore of the blank 4 may be slightly tapered, as shown in Figure 7, to correspond to the taper of the bore in the blank. This may be accomplished by turning or swaging.

After the core has been inserted through the bore of the blank 4, as shown in Figure 8, wire elements 7 are inserted through the apertures formed by the grooves 8, as shown in Figure 10. A relatively larger wire 9 may be inserted through the bore of the core 6.

The blank 4 is then again swaged to further reduce its diameter and increase its length. This swaging operation reduces the grooves 8 in the bore of the blank 4 and also the bore in the core 6, to the diameters of the wires 7 and 9, as clearly illustrated in Figures 9 and 10. The wire elements 7 and 9 are then removed, whereby a plurality of apertures are provided through the partially completed torch tip, as will readily be understood.

In the torch tips of this general character, it is usually more desirable to have the discharge ends of terminals thereof reduced in diameter or tapered, as shown in Figures 11 and 12. It may also be desirable to have the apertures 11, which supply the fuel gas to the tip of the torch, reduced in size at the discharge end of the tip, as shown in Figure 12. This is accomplished by inserting relatively smaller wires 13 into the apertures 11 at the discharge end of the tip, as shown in Figure 11. A slightly larger wire 14 is inserted into the central aperture 12, and the end of the partially completed tip is then swaged to reduce it to a taper, as shown in Figures 11 and 12. This final swaging operation elongates the end of the tip and reduces the diameters of the apertures 11 and 12 to the diameters of the wires 13 and 14. The wires 13 and 14 are then removed, after which the body of the torch tip is finished to complete it for attachment to a torch head.

The process herein disclosed is exceedingly simple and makes it possible to construct the tip of stock sizes of copper tubing, and without requiring any drilling. In other words, the blank 4 which forms the outer portion of the torch tip may be cut from standard tubing and is then swaged, as hereinbefore stated, first on the arbor 2, and then on the core 6, until the various swaging operations have been performed to complete the tip to the size and form shown in Figure 12. When thus completed the blank 4 forming the outer portion of the tip and the core 6 will be so firmly united, because of the several swaging operations, that they become in effect, an integral unit. It will also be noted that all of the apertures formed in the tip are accomplished without drilling, whereby the cost of manufacture is greatly reduced.

In the accompanying drawing, I have shown the finished torch tip provided with a tapered discharge end, whereby the discharge ends of the passages formed by the wires 13 and 14 may be located relatively closer to the central orifice, as shown in Fig. 12. It is to be understood, however, that in some tips, it may be deemed more desirable to outwardly space the discharge ends of the passages 11 from the central orifice 12 a greater distance than shown in Figures 11 and 12, in which case the final operation of drawing the body of the torch tip down to a taper by swaging, may be dispensed with.

I claim as my invention:

1. A process of forming a torch tip which consists in placing a tubular blank of ductile metal on a longitudinally ribbed arbor, swaging said blank until its bore is reduced and shaped to conform to the periphery of the arbor, then removing the arbor, whereby a plurality of longitudinal grooves are provided in the bore of the blank, inserting an unribbed core of ductile metal in the grooved bore of the blank, then inserting wire elements through the apertures formed by said grooves, and again swaging the blank to further reduce its diameter, and whereby said apertures are reduced to the diameter of said wires, and then removing the wires.

2. A process of forming a torch tip which consists in placing a tubular blank of ductile metal on a longitudinally ribbed arbor, swaging said blank until its bore is reduced and shaped to conform to the periphery of the arbor, removing the arbor whereby a plurality of longitudinal grooves are provided in the bore of the blank, inserting an unribbed tubular core of ductile metal in the grooved bore of the blank, then inserting wire elements through the apertures formed by said grooves and also through the bore of said core, again swaging the blank to further reduce its diameter and lengthen it and whereby said apertures are reduced to the diameter of said wires, and then removing the wires.

3. A process of forming a torch tip which consists in placing a tubular blank of ductile metal on a longitudinally ribbed tapered arbor of non-ductile metal, swaging said blank until its bore is reduced and shaped to conform to the ribbed periphery of the arbor, removing the arbor, whereby a plurality of longitudinal grooves are provided in the bore of the blank, inserting an unribbed tapered core of ductile metal in the grooved bore of the blank, whereby a plurality of longitudinal apertures are provided, then inserting wire elements through the apertures formed by said grooves, again swaging said blank to further reduce its diameter and lengthen it and whereby said apertures are reduced to the diameter of said wires, and then removing the wires.

4. A process of forming a torch tip which consists in placing a tubular blank of ductile metal on a longitudinally ribbed tapered arbor of non-ductile metal, swaging said blank until its bore is reduced and shaped to conform to the ribbed periphery of the arbor, removing the arbor, whereby a plurality of longitudinal grooves are provided in the bore of the blank, inserting an unribbed tapered core of ductile metal into the grooved bore of the blank, whereby a plurality of longitudinal apertures are provided, then inserting wire elements through the apertures formed by said grooves, again swaging said blank to further reduce its diameter and lengthen it and whereby said apertures are reduced to the diameter of said wires, then removing said wires, and finally partially inserting relatively smaller wires into the apertures thus formed, from one end of the partially completed tip, and swaging only said end to taper it and to reduce the size of the apertures at said end of the tip to the diameter of said relatively smaller wires, and then removing said smaller wires.

5. A process of forming a torch tip which consists in placing a tubular cylindrical blank of ductile metal on a longitudinally ribbed tapered arbor of non-ductile metal, swaging said blank until its bore is reduced and shaped to conform to the ribbed periphery of the arbor, removing the arbor, whereby a plurality of longitudinal grooves are provided in the bore of the blank, inserting into the grooved bore of the blank an unribbed tapered core of ductile metal, whereby a plurality of longitudinal apertures are provided, said core having an axial bore extending lengthwise therethrough, then inserting wire elements through the apertures formed by said grooves and a relatively larger wire through the bore in said core, then swaging the blank to further reduce its diameter and lengthen it and whereby all of said apertures are reduced to the diameters of said wires, and removing all of said wires.

ELMER H. SMITH.